United States Patent
Hörmeyer et al.

(10) Patent No.: US 9,752,584 B2
(45) Date of Patent: Sep. 5, 2017

(54) COMPRESSOR ARRANGEMENT

(71) Applicants: Klaus Hörmeyer, Duesseldorf (DE);
Roland Emmrich, Duesseldorf (DE);
Bernhard Eisenberg, Bochum (DE);
Dirk Anding, Bottrop (DE); Henning
Ressing, Bottrop (DE)

(72) Inventors: Klaus Hörmeyer, Duesseldorf (DE);
Roland Emmrich, Duesseldorf (DE);
Bernhard Eisenberg, Bochum (DE);
Dirk Anding, Bottrop (DE); Henning
Ressing, Bottrop (DE)

(73) Assignee: MAN Diesel & Turbo SE, Augsburg (DE)

( * ) Notice: Subject to any disclaimer, the term of this patent is extended or adjusted under 35 U.S.C. 154(b) by 299 days.

(21) Appl. No.: 14/495,501

(22) Filed: Sep. 24, 2014

(65) Prior Publication Data
US 2015/0139788 A1 May 21, 2015

(30) Foreign Application Priority Data

Sep. 26, 2013 (DE) .......... 10 2013 015 993

(51) Int. Cl.
F04D 17/02 (2006.01)
F01D 5/14 (2006.01)
F02C 3/08 (2006.01)
F04D 29/66 (2006.01)
F02C 3/14 (2006.01)

(52) U.S. Cl.
CPC ........... *F04D 17/025* (2013.01); *F01D 5/143* (2013.01); *F02C 3/08* (2013.01); *F04D 29/666* (2013.01); *F02C 3/14* (2013.01)

(58) Field of Classification Search
CPC ...... F04D 17/025; F04D 17/02; F04D 17/122;
F04D 19/046; F04D 29/04; F04D 29/043;
F04D 29/05; F04D 29/053; F04D 29/20;
F04D 29/266; F01D 5/026
USPC ...................................... 415/216.1
See application file for complete search history.

(56) References Cited

U.S. PATENT DOCUMENTS 4,693,669 A * 9/1987 Rogers, Sr. ........... F04D 17/025
415/122.1
6,074,169 A * 6/2000 Siga ...................... C22C 38/001
415/200

(Continued)

FOREIGN PATENT DOCUMENTS

DE 10 2009 016 392 A1 10/2010
JP H0914187 * 1/1997

OTHER PUBLICATIONS

JPH0914187 (Chiba et al.) (Jan. 1997).*

Primary Examiner — Richard Edgar
Assistant Examiner — Su Htay
(74) Attorney, Agent, or Firm — Cozen O'Connor

(57) ABSTRACT

A compressor arrangement has a common shaft, an axial compressor having at least a single-stage, and a radial compressor having at least single-stage. Assemblies of the, or each, axial compressor stage on the rotor side and assemblies of the, or each, radial compressor stage on the rotor side are attached to a common shaft (4). A ratio between a maximum diameter of the shaft (4) in the region of the axial compressor (2) and a minimum radial impeller seat diameter of the shaft (4) in the region of the radial compressor (3) is between 1.5 and 3.0.

5 Claims, 1 Drawing Sheet

(56) References Cited

U.S. PATENT DOCUMENTS

| | | | |
|---|---|---|---|
| 7,478,629 B2* | 1/2009 | del Valle Bravo | F02B 33/36 123/559.1 |
| 2009/0214348 A1* | 8/2009 | Buccheri | F04D 19/042 416/204 A |
| 2012/0189431 A1 | 7/2012 | Gingter et al. | |
| 2014/0112763 A1* | 4/2014 | Bosen | F04D 29/058 415/122.1 |

* cited by examiner

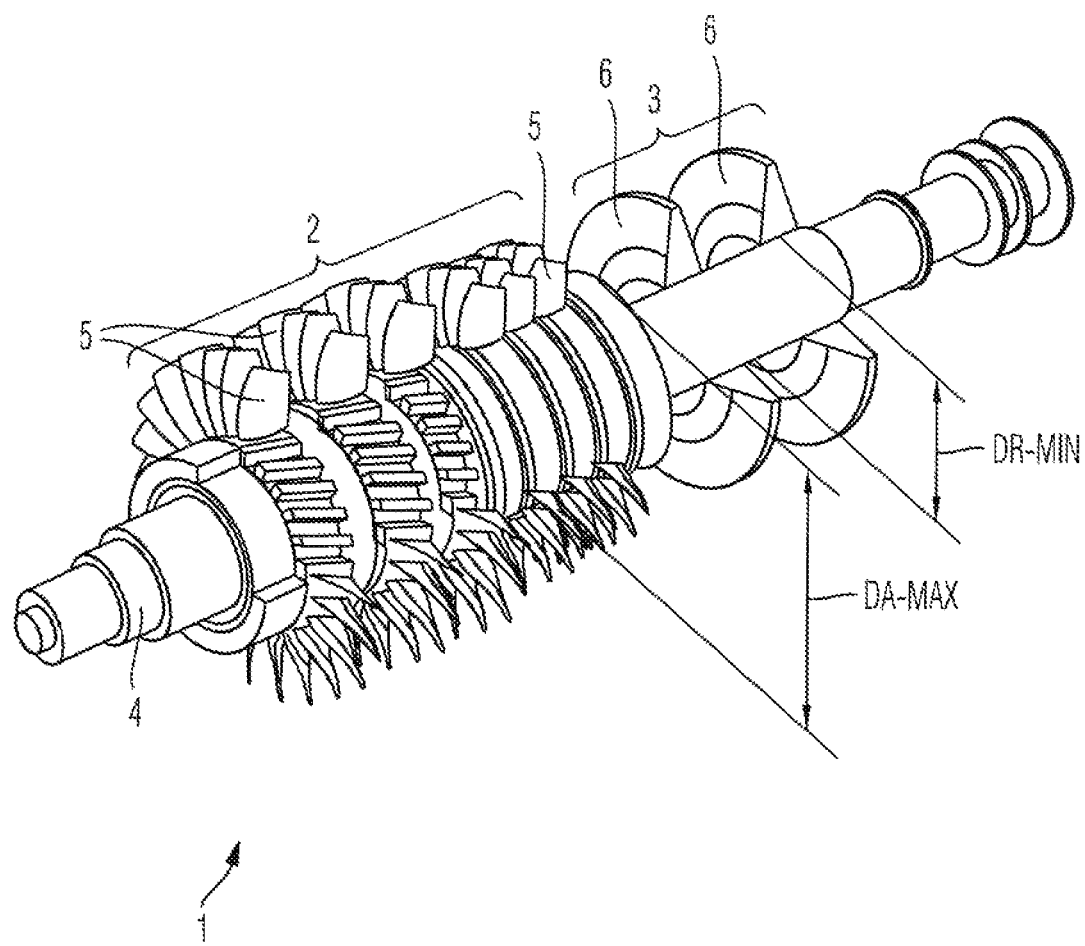

COMPRESSOR ARRANGEMENT

BACKGROUND OF THE INVENTION

1. Field of the Invention

The invention relates to a compressor arrangement.

2. Description of the Related Art

From DE 10 2009 016 392 A1, the content of which is incorporated herein by reference in its entirety, a compressor arrangement having an axial compressor and a radial compressor is known, which are arranged axially behind one another on a common shaft. According to DE 10 2009 016 392 A1, assemblies of the, or each, axial compressor stage of the axial compressor on the rotor side and assemblies of the, or each radial compressor stage of the radial compressor on the rotor side accordingly are arranged on the common driveshaft or fastened on the same.

The maximum possible pressure build-up of such a compressor arrangement is rotor-dynamically limited. Accordingly, the pressure build-up is limited in particular through the natural frequency, the stiffness and the damping characteristic of the assemblies of the compressor arrangement on the rotor side.

Compressor arrangements of an axial compressor and radial compressor known to date, which are axially arranged one after the other on a common driveshaft are characterized in that the driveshaft in the region of the axial compressor and of the radial compressor has approximately identical diameters. This also follows from the sketch of DE 10 2009 016 392 A1.

There is a need for a compressor arrangement, with the help of which the pressure build-up can be increased compared with known compressor arrangements.

SUMMARY OF THE INVENTION

Starting out from this, an object of the present invention is creating a new type of compressor arrangement. This object is achieved through a compressor arrangement in which a ratio between a maximum diameter of the shaft in the region of the axial compressor and a minimum radial impeller seat diameter of the shaft in the region of the radial compressor is between 1.5 and 3.0.

With the present invention it is proposed, in the case of a compressor arrangement having an axial compressor and a radial compressor with a common shaft, to raise the diameter of the shaft in the region of the axial compressor, namely such that the maximum diameter of the shaft in the region of the axial compressor is at least 50% larger than the minimum radial impeller seat diameter of the shaft in the region of the radial compressor. Because of this, the pressure build-up that can be provided can be increased relative to known compressor arrangements and the construction length of such compressor arrangements can be shortened.

Preferentially, the ratio between the maximum diameter of the shaft in the region of the axial compressor and the minimum radial impeller seat diameter of the shaft in the region of the radial compressor is between 1.8 and 3.0. This ratio between the diameters of the shaft is particularly preferred.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

Preferred further developments of the invention are obtained from the following description and exemplary embodiments of the invention are explained in more detail with the help of the drawing without being restricted to what is illustrated there. In the drawing:

FIG. 1: is a schematic, perspective representation of a compressor arrangement according to the invention.

DETAILED DESCRIPTION OF THE PRESENTLY PREFERRED EMBODIMENTS

The present invention relates to a compressor arrangement of an at least single-stage axial compressor and an at least single-stage radial compressor.

FIG. 1 shows a schematic, perspective lateral view of assemblies of an exemplary embodiment of a compressor arrangement 1 according to the invention on the rotor side, the compressor arrangement 1 of FIG. 1 comprising a multi-stage axial compressor 2 and a multi-stage radial compressor 3. In the illustrated exemplary embodiment, the axial compressor 2 comprises seven axial compressor stages and the radial compressor 3 comprises two radial compressor stages, wherein axial compressor 2 and radial compressor 3 are axially attached one behind the other or next to one another on a common shaft 4. Accordingly, FIG. 1 shows that moving blades 5 of the axial compressor 2 on the rotor side and radial impellers 6 of the radial compressor stage 3 are attached or fastened to the common shaft 4 axially one behind the other or next to one another.

In the compressor arrangement 1 according to the invention, a ratio between a maximum diameter DA-MAX of the shaft 4 in the region of the axial compressor 2 and a minimum radial impeller seat diameter DR-MIN of the shaft 4 in the region of the radial compressor 3 is between 1.5 and 3.0.

In the illustrated preferred exemplary embodiment of the invention, the maximum diameter DA-MAX of the shaft 4 is located in the region of the axial compressor 2 in the region of the last axial compressor stage of the axial compressor 2, the minimum radial impeller seat diameter DR-MIN of the shaft 4 in the region of the radial compressor 3 is located in the region of the first radial compressor stage of the radial compressor 3. As explained above, this ratio between the diameters DA-MAX and DR-MIN is between 1.5 and 3.0, so that the maximum diameter DA-MAX of the shaft 4 in the region of the axial compressor 2 is at least 50% larger than the minimum radial impeller seat diameter DR-MIN of the shaft 4 in the region of the radial compressor 3.

According to an advantageous further development of the invention, the ratio between the maximum diameter DA-MAX of the shaft 4 in the region of the axial compressor 2 and the minimum radial impeller seat diameter DR-MIN of the shaft 4 in the region of the radial compressor 3 is between 1.8 and 3.0.

According to a first advantageous further development of the invention, this ratio between the diameter DA-MAX and the diameter DR-MIN of the shaft 4 is between 2.0 and 3.0.

According to a first advantageous further development of the invention, this ratio between the diameter DA-MAX and the diameter DR-MIN of the shaft 4 is between 1.8 and 2.5.

According to a first advantageous further development of the invention, this ratio between the diameter DA-MAX and the diameter OR-MIN of the shaft 4 is between 2.0 and 2.5.

In particular, when the ratio between the maximum diameter of the shaft 4 in the region of the axial compressor 2 and the minimum radial impeller seat diameter of the shaft 4 in the region of the radial compressor 3 is in the above ranges, the pressure build-up realized, compared with compressor arrangements known from the prior art, can be more than doubled.

A further advantage of the compressor arrangement 1, according to the invention, is that the total construction length of the compressor arrangement 1 can be shortened. In particular, the number of the compressor stages that are required for realizing the pressure build-up can be reduced in the region of the axial compressor 2.

The compressor arrangement in terms of the present invention preferentially is a back-to-back compressor arrangement, in the case of which the last axial compressor stage of the axial compressor is thus located opposite the last radial compressor stage of the radial compressor 3.

For the exemplary embodiment shown in FIG. 1 this means that the medium to be compressed initially flows through the axial compressor 2 from the left to the right, following this, after the build-up of a defined intermediate pressure through the axial compressor 2, the medium is conducted into a cooler for intermediate cooling in order to subsequently flow through the radial compressor 3 from the right to the left.

It is pointed out here once more that the number of axial compressor stages of the axial compressor 2 and the number of radial compressor stages of the radial compressor 3 can be any number and is not limited to the illustrated embodiment.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it s expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A compressor arrangement (1), comprising:
   an axial compressor (2) having at least one axial compressor stage;
   a radial compressor (3) having at least one radial compressor stage; and
   a common shaft (4) having a maximum diameter in a region of the axial compressor (2) and a minimum radial impeller seat diameter in a region of the radial compressor (3),
   wherein the axial compressor stage on a rotor side and the radial compressor stage on the rotor side are attached to the common shaft (4), and
   wherein a ratio between the maximum diameter of the shaft (4) in the region of the axial compressor (2) and the minimum radial impeller seat diameter of the shaft (4) in the region of the radial compressor (3) is between 1.5 and 3.0.

2. The compressor arrangement according to claim 1, wherein the ratio between the maximum diameter of the shaft (4) in the region of the axial compressor (2) and the minimum radial impeller seat diameter of the shaft (4) in the region of the radial compressor (3) is between 1.8 and 3.0.

3. The compressor arrangement according to claim 2, wherein the ratio between the maximum diameter of the shaft (4) in the region of the axial compressor (2) and the minimum radial impeller seat diameter of the shaft (4) in the region of the radial compressor (3) is between 2.0 and 3.0.

4. The compressor arrangement according to claim 2, wherein the ratio between the maximum diameter of the shaft (4) in the region of the axial compressor (2) and the minimum radial impeller seat diameter of the shaft (4) in the region of the radial compressor (3) is between 1.8 and 2.5.

5. The compressor arrangement according to claim 2, wherein the ratio between the maximum diameter of the shaft (4) in the region of the axial compressor (2) and the minimum radial impeller seat diameter of the shaft (4) in the region of the radial compressor (3) is between 2.0 and 2.5.

* * * * *